Feb. 21, 1933.                G. A. CONRATH                1,898,341
                         PULVERIZED FUEL SYSTEM
                  Original Filed Jan. 16, 1926    6 Sheets-Sheet 1
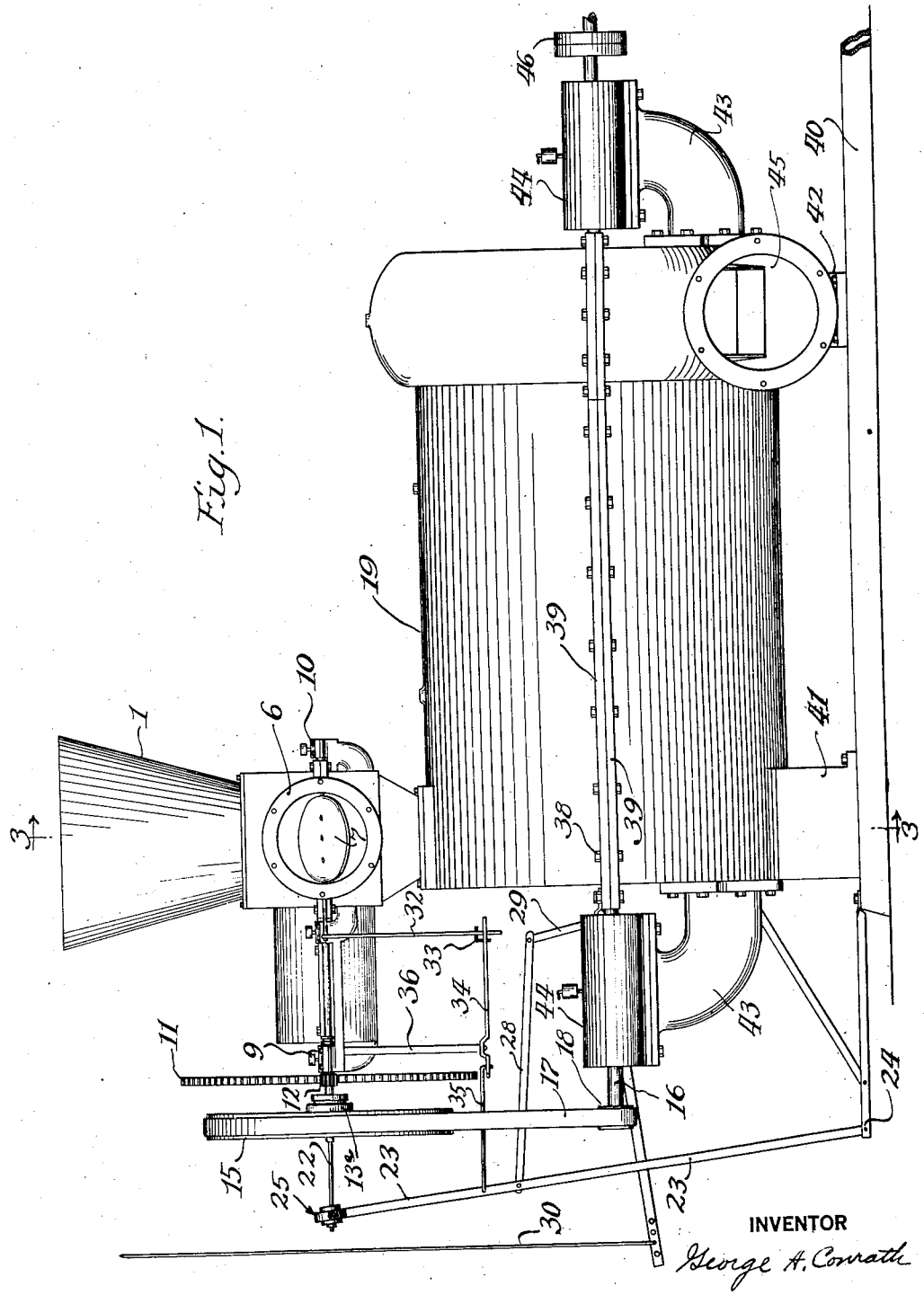
INVENTOR
George A. Conrath
by Rector, Hibben, Davis and Macauley Atty's.

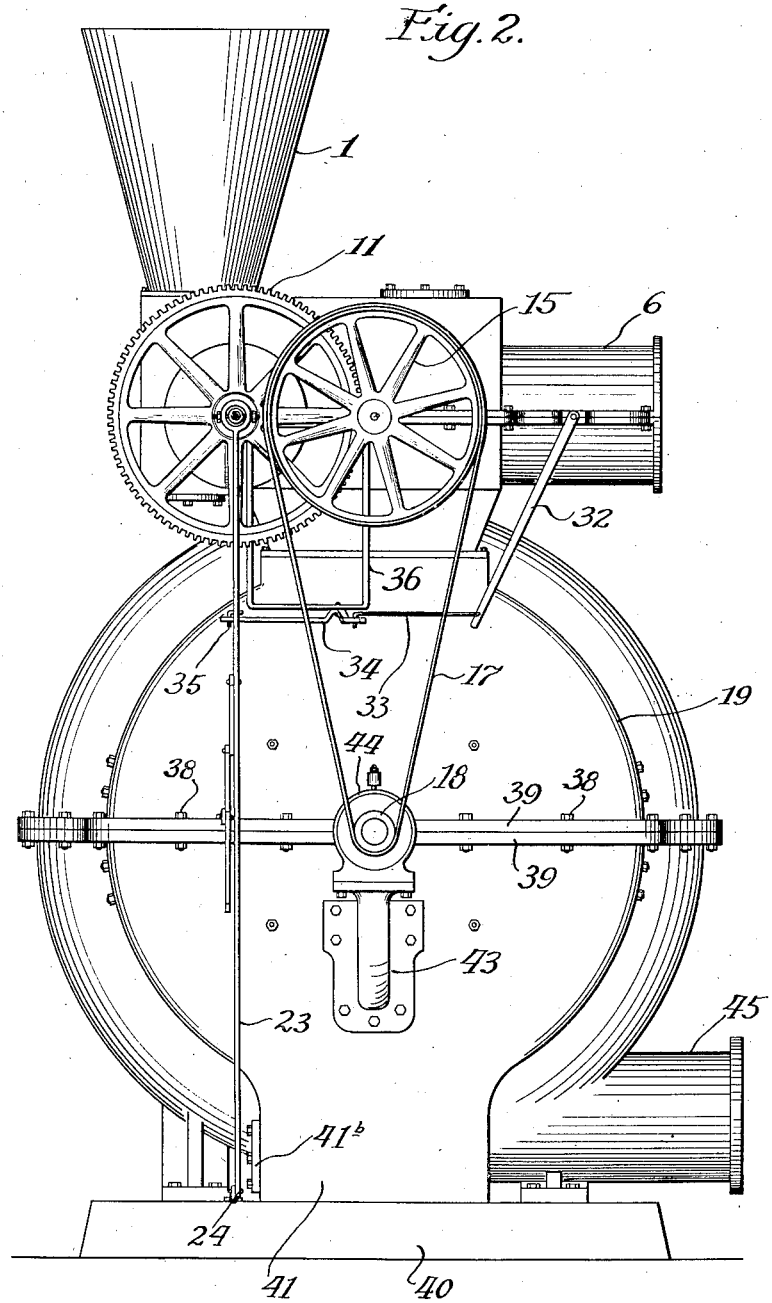

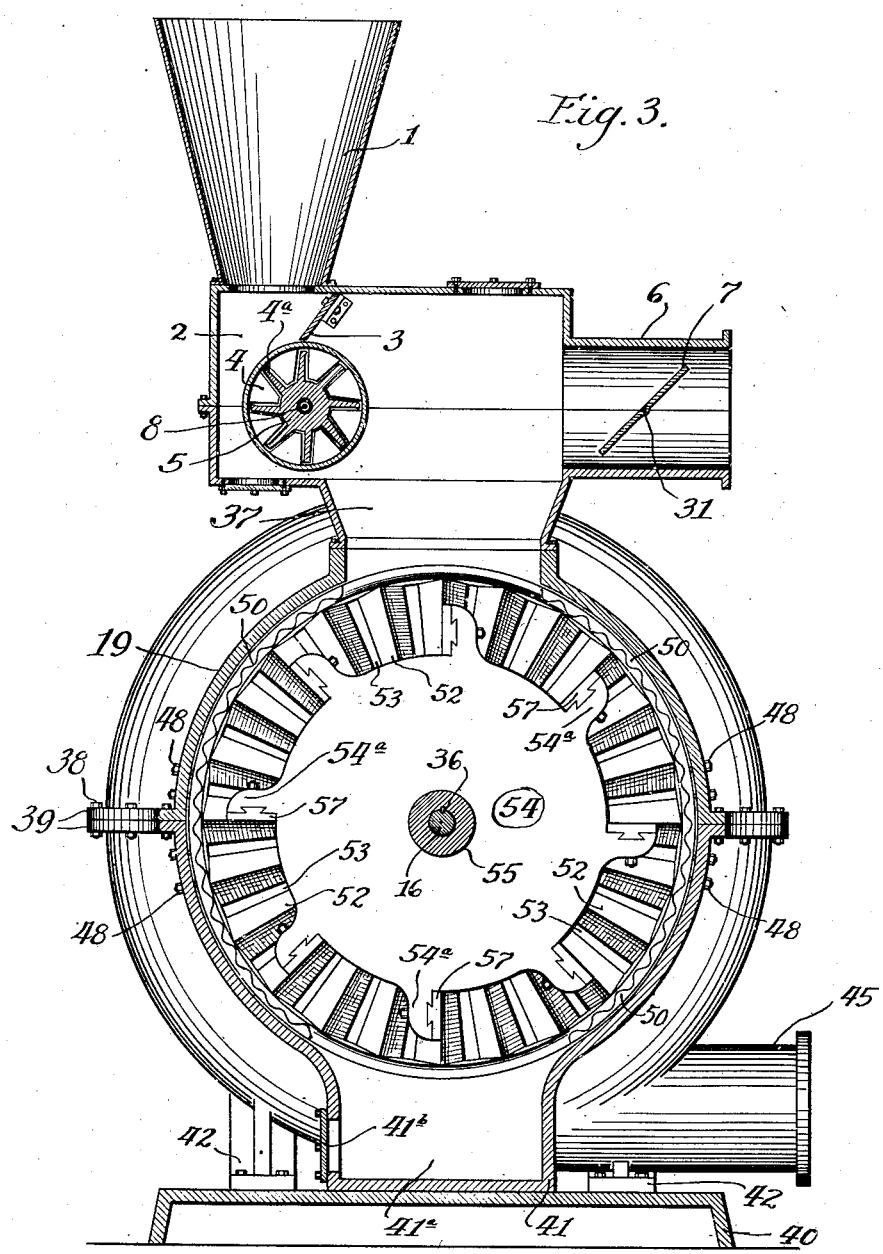

Feb. 21, 1933.  G. A. CONRATH  1,898,341
PULVERIZED FUEL SYSTEM
Original Filed Jan. 16, 1926   6 Sheets-Sheet 4
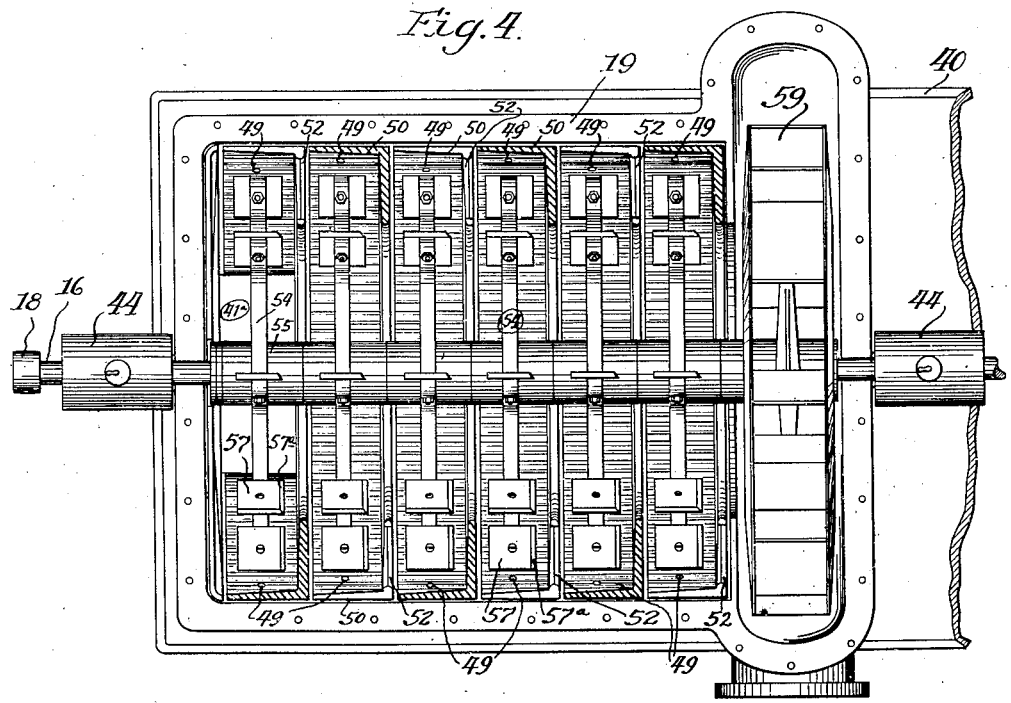
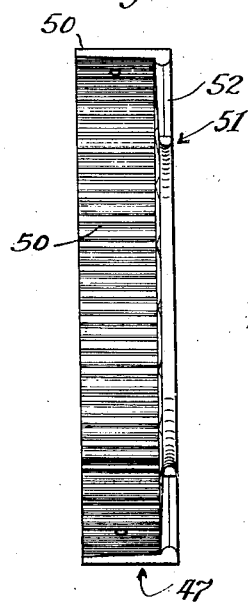
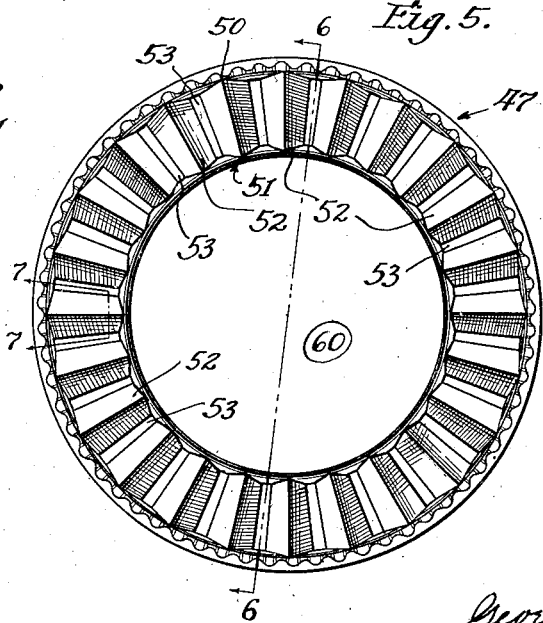
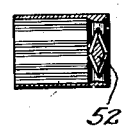
INVENTOR
George A. Conrath
by Rector, Hibben, Davis and Macauley  Attys.

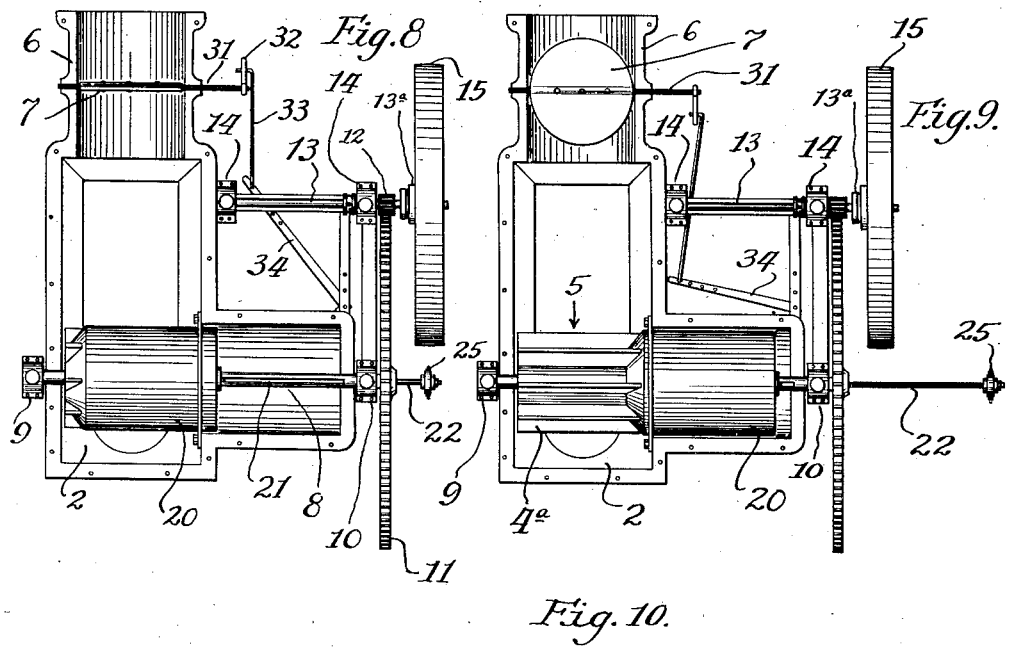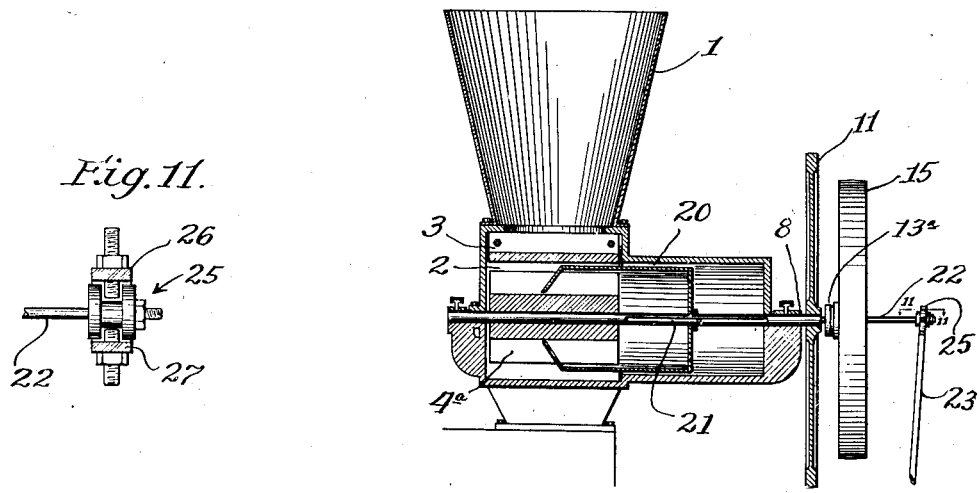

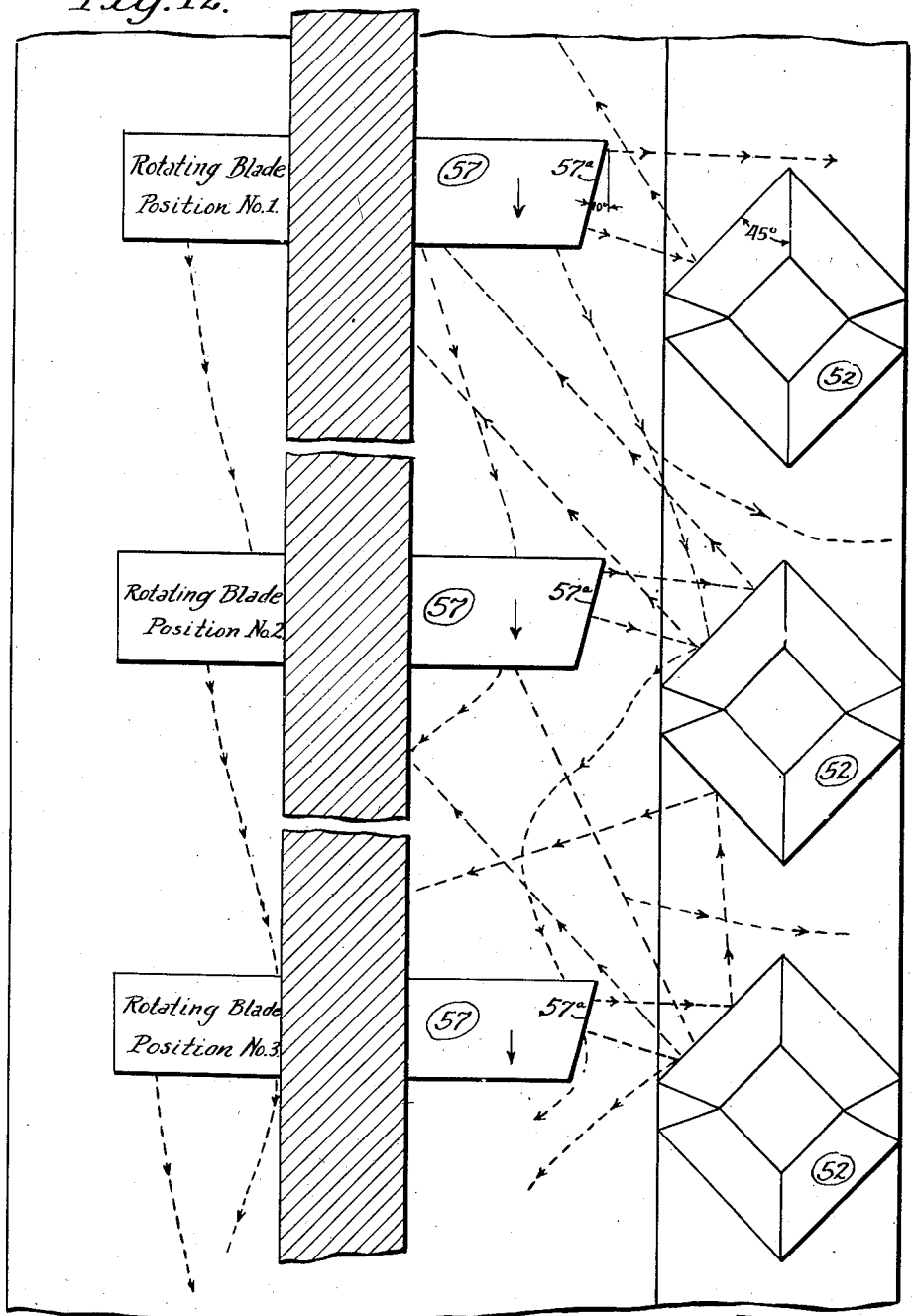

Patented Feb. 21, 1933

1,898,341

UNITED STATES PATENT OFFICE

GEORGE A. CONRATH, OF CHICAGO, ILLINOIS, ASSIGNOR OF ONE-HALF TO CHARLES S. DENMAN

PULVERIZED FUEL SYSTEM

Application filed January 16, 1926, Serial No. 81,628. Renewed June 27, 1932.

My invention relates generally to a pulverized fuel system and, more particularly, to an apparatus for pulverizing fuel ore, such as coal, for use in a burner, wherein means are provided for drying and feeding the ore in its mined state to a pulverizing means where it is thoroughly pulverized and then thoroughly admixed with air in the proper proportions and delivered to such burner for combustion purposes.

In the use of pulverized ore, such as coal for fuel, it is highly desirable that the pulverized fuel be formed, then admixed with air in the proper portions and delivered in a continuous and uniform manner to a burner, dependent upon the temperature, pressure or other condition to be effected and maintained by the use of such fuel. It is desirable that the amount of fuel ore fed, as well as the amount of mixture formed and delivered in a given time, be automatically controlled by the temperature or pressure, or whatever it may be, condition to be produced and maintained. For example, in the case of using the pulverized fuel to supply heat for producing a certain steam pressure in a boiler, it is desirable that the feed and delivery of the fuel ore, in its mined and pulverized states, respectively, be controlled at all stages automatically by the steam pressure in the boiler in such a manner that, if the steam pressure falls then the amount of fuel fed and pulverized and delivered is increased and, vice versa, is diminished upon an increase in such steam pressure. This same condition may also be desirable where the pulverized fuel is delivered to burners for producing and maintaining a certain predetermined temperature condition. It is well recognized that the foregoing desirable conditions do not exist when the human element enters into any of the successive steps of feeding, pulverizing and delivering, due to the fact that the skill and judgment of different operators necessarily varies or the judgment of a single operator may vary at different times, resulting in a non-uniform feed and delivery with the resultant undesirable changes in the temperature or pressure, or the like, which it is sought to maintain.

One of the objects of my invention is to provide a more efficient pulverized fuel system embodying the desirable features just referred to, wherein the amount of non-pulverized fuel fed and the amount of combustible mixture delivered are controlled relatively in a uniform and exact manner by the pressure or temperature, or whatever condition, it is sought to produce and maintain.

In the use of my invention, the fuel ore may be delivered in its mined state directly to hoppers or containers which have a direct communication with my pulverizing system, and may require no further handling after being so delivered. This ore may be more or less damp or wet which tends to hinder ready pulverizing of the same when it is fed to the pulverizing means. Hence, another object of my invention is to provide for drying of the fuel ore as it is fed and before it is delivered to the pulverizing means, whereby the ore may be more readily broken up and transformed to a pulverized state.

A further object is to subject the ore to impact in successive impact chambers by such an arrangement as to cause such ore, in whatever form it may be, to pass through said compartments in an irregular path; and to, also, cause the air that travels with such ore to take such irregular course.

Another object is to subject the ore to rapidly rotating impact members in successive compartments in such a manner as to cause the ore thrown toward the succeeding compartment to rebound into the path of the oncoming impact members to be resubjected to impact, this action taking place repeatedly until the ore finally finds its way into such succeeding compartment. To accomplish this object I employ blade members rotating relative to stationary blade members of such construction as to cause ore thrown thereagainst to rebound into the path of the rotating blades and to be re-subjected to impact before delivery to the succeeding impact compartment.

Still another object is to provide impact members adapted to drive the coal in its more or less pulverized state toward the delivery point.

A further object is to provide means for dividing a pulverizing chamber into a plurality of compartments in such a manner that the direct throw of coal from one compartment to the other is opposed, and so that only coal of predetermined size can pass directly from one compartment to another.

Another object is to provide positive acting mechanical means for driving pulverized ore from one compartment to another toward the place of combustion.

Other and further objects will become apparent hereinafter and by reference to the drawings wherein, Figure 1 is a side elevation of a fuel pulverizing apparatus constructed in accordance with my invention.

Figure 2 is an end view of the apparatus shown in Fig. 1.

Figure 3 is a vertical section of the apparatus taken through the feed end thereof substantially on line 3—3 of Fig. 1.

Figure 4 is a top plan view of the pulverizer portion of the structure of Fig. 1, the top half of the pulverizer casing being removed to show the relative position of the parts carried therein.

Figure 5 is a front plan view of one of the stationary blade members carried by the pulverizer casing, a plurality of such members being arranged therein in such manner as to divide such casing into a plurality of compartments.

Figure 6 is a sectional view of the stationary blade member taken on line 6—6 of Fig. 5.

Figure 7 is a sectional view taken on line 7—7 of Fig. 5 showing the cross-sectional construction of the radial blades of the stationary blade member.

Figure 8 is a top plan view of the feeding portion of the apparatus shown in Fig. 1 with the top cover and hopper removed, and showing the feeding measuring device and air inlet valve in closed position.

Figure 9 is a view similar to that of Fig. 8 except that the feed measuring device and air inlet valve are shown in their open positions.

Figure 10 is a vertical sectional view of the feeding portion of my apparatus, being taken at substantially right angles to the section of Fig. 3, the pulverizer casing and connected mechanism not being shown.

Figure 11 is a detailed sectional view of the variable connection between the feed measuring sleeve drive rod and its connected sleeve lever.

Figure 12 is a diagrammatic view illustrating the successive positions which one of the rotative impact blades may assume relative to one of the radial stationary blades, the dotted lines illustrating generally the path of the coal particles from the beveled edge of the rotary blade to face of stationary blade and back into the path of the oncoming blades, and the dash lines illustrating generally the path of the particles thrown directly from the face of the rotating blades around the stationary blades.

My pulverizing apparatus may comprise generally a pulverizing chamber with means for delivering the ore to be pulverized thereto and for delivering the pulverized ore therefrom to the burners or other desired source. Referring to Fig. 2 of the drawings, the means which I, preferably, employ for feed to the pulverizer chamber may comprise a hopper 1 which is adapted to be directly connected to and fed by a main ore bin or hopper to which the ore may be delivered direct from the mine. The lower end of this hopper 1 is in communication with a feed chamber 2 having a deflector 3 for directing the ore upon and within the pockets 4 formed by the longitudinal blades 4$^a$ of the feed wheel 5. The feed wheel 5 and its blades 4$^a$ are preferably of such rugged construction and driven from such a source of power, as will be explained hereinafter, as to break up the larger blocks of the ore. The feed chamber 2 has connected thereto an air inlet pipe 6 which is throttled, to admit a greater or lesser amount of air, by the valve 7. The air admitted through the inlet 6 is preheated, in any desired manner, to such an extent that by coming in contact with the coal fed by the wheel 5, such coal is made sufficiently dry to be readily pulverized when it enters the pulverizing chamber. The feed wheel 5 is carried by a shaft 8 passing through the side walls of the feed chamber casing and journaled in bearings 9 and 10 (see Figs. 8, 9 and 10) to permit of rotation of the same, to cause the feed wheel to rotate, by movement of the gear wheel 11. Motion is transmitted to the gear 11 by the gear wheel 12 which meshes with it and which is mounted upon the shaft 13 journaled in bearings 14. A drive wheel 15 is connected to the main drive shaft 16 (Fig. 1) by belt 17 and pulley 18, and is connected to the shaft 13 and gear 12 by a suitably provided clutch 13$^a$ whereby, upon rotation of the main drive shaft, the feed wheel 5 is caused to rotate in an obvious manner. The clutch may be disengaged to stop the feed wheel, as desired. The casing enclosing the feed chamber 2 is mounted upon and carried by the pulverizer casing 19, as shown in Fig. 1.

In carrying out my invention, I provide means for controlling the amount of fuel ore fed through the hopper 1 to and past the feed wheel 5, the amount of coal so fed being automatically controlled directly by the pressure, temperature or other condition which it is sought to produce and maintain by the use of the pulverized fuel. The means which I employ preferably takes the form of a sliding sleeve drum member 20 (Figs. 8, 9 and 10), having one end carried directly by the shaft 8 and the other end so slotted and formed as to snugly fit over and slidably engage the blades 4ª of the wheel. This measuring sleeve 20 is adapted to be moved backward and forward along the shaft 8 and over the blades 4ª to reduce the effective length of the blades 4ª and size of the pockets 4 and, consequently, the amount of ore which will pass to and be delivered by the feed wheel 5; or this sleeve 20 may be moved, as shown in Fig. 8, to entirely cut off the bladed area of the feed wheel and close the pockets 4 whereby continued rotation of the feed wheel, obviously, will not produce any further feeding of the coal.

In order to permit of and to provide for the sliding movement of the measuring sleeve 20, the shaft 8 is preferably at one end hollow and is slotted as shown at 21 in Figs. 8 and 10. The sleeve 20 engages the shaft 8 at the slotted portion, in such manner that the sliding movement is permitted, at the same time providing for rotation of the sleeve with such shaft. The sliding movement of the sleeve 20 is effected by the rod 22 which is adapted to enter the hollow portion of the shaft 8 and engage the sleeve 20 through the slotted portion 21 in such a manner that upon moving the rod 22 back and forth, the sleeve 20 is moved back and forth over the blades 4ª to increase and decrease, respectively, the bladed area and size of the pockets 4. The movement of the rod 22 and sleeve 20 is automatically controlled by the pressure or temperature condition, or both, produced by the pulverized fuel used. The preferred control which I employ for this purpose, takes the form of a lever 23 (see Fig. 1) pivotally supported at one end as at 24, and connected to the rod 22 at its other end by the connecting member 25, shown in detail in Fig. 11. It is obvious that as the lever 23 is oscillated, its upper end will travel in an arc, whereby means must be provided to compensate for this movement without interfering with the movement of the rod 22 and sleeve 20. One manner of taking care of this condition is shown in Fig. 11 wherein adjustable members 26 and 27 are provided. These members hold the levers 22 and 23 in operative relation, at the same time allowing sufficient play between them to compensate for the arcuate travel of the end of the rod 23. The lever 28 is pivotally connected at one end to the lever 23, the other end being pivotally connected to a bell crank 29, the connection between these several parts being such that as the free end of the bell crank is moved, the lever 23 is also caused to move back and forth to move the rod 22 and sleeve 20 back and forth. In order that the movement of the sleeve be controlled by the condition set up by the fuel fed, the free end of the bell crank 29 is adapted to be adjustably connected through the connecting rod 30, and such other connecting rods and levers as may be necessary, to a suitable pressure or temperature registering or indicating device, such as may be best adapted to the particular conditions of use. For example, the rod 30 may be connected, in some instances, to one of the well known automatic draft regulators used in connection with furnaces or may be connected with some means for indicating steam pressure or for indicating or measuring the temperature of the gases delivered from the furnaces. There are many of such devices which are well known and, since their construction forms no part of my invention, an illustration has not been made in this respect. With this construction, as the temperature or pressure indicator moves to register a higher temperature, the arrangement is such that the rod 30 will be moved to move the sleeve 20 to restrict the flow of coal and, vice versa, as the temperature or pressure decreases, the rod 30 will be moved to move the sleeve to feed a greater amount of coal.

It is recognized that as the amount of coal fed is increased or diminished, the heated air entering through the inlet pipe 6 should be correspondingly increased or diminished to supply a greater or lesser amount of heated air for heating the greater or lesser amount of fuel ore and for feeding a greater or lesser amount of air for mixing with the greater or lesser amount of pulverized coal formed. To bring about this condition in a constantly uniform manner it is desirable that the feeding of the air and coal be cooperatively controlled from the same source, that is, by the temperature or pressure or other condition which it is sought to produce and maintain. To effect this, the shaft 31 carrying the air valve 7 extends through the air inlet wall and is connected by the levers 32 and 33 to the bell crank 34, the opposite end of which is connected to a lever 35 which, in turn, is connected to the main sleeve operating member 23, (Figs. 1, 8 and 9). The bell crank 34 and levers 32, 33 and 35 are so associated and pivotally connected that upon movement of the lever 23 to move the measuring sleeve 20 in or out, the air valve 7 is caused to move toward and from a closed position. The bell crank 34 is carried by the support 36 which is, in turn, carried by the air inlet casing. The bell crank 34 and its support 36 are provided with a plurality of holes for adjusting the associated ends of the respective levers therein, the purpose of this arrangement being such as to properly adjust the levers to cause the air valve 7 and sleeve 20 to move in the proper relations to deliver the proper proportion of air and coal under predetermined operating conditions. The bell crank 29 is also provided with a series of adjusting holes for adjustably connecting the rod 30 thereto to adjust the simultaneous operation of the measuring sleeve and valve to varying conditions. However, this adjustment is made without disturbing the adjustments, heretofore explained as determining the relation between the air valve and measuring sleeve.

After the fuel ore is fed to and past the feed wheel 5 and dried, it passes through the opening 37 to the interior of the pulverizer casing 19. The cylindrical pulverizer casing 19 is, for the purpose of facilitating installation, formed in two sections, these sections being joined together by suitably provided bolts and nuts 38 passing through the seated flange portions 39. The lower section of the pulverizer casing is mounted upon a suitable support 40 by means of the legs 41 and 42. The interior of the leg 41 is provided with a pocket 41ª for receiving pieces of iron, and the like, which may pass into the first pulverizer compartment. The door 41ᵇ is provided for removing such pieces from the pocket. The cylindrical portion 50 of the first stationary blade member 47 is arranged to provide an entrance way into this pocket 41ª as shown in Fig. 3. The opposite ends of the lower section of the casing 19 are provided with supporting brackets 43 which removably carry bearings 44 in which the main drive shaft, after passing through the casing 19, is journaled. The casing 19 is also provided with a discharge nozzle 45. The main shaft 16 at the discharge end of the casing 19 is adapted to be connected to any desired means for causing rotation thereof, the means shown in the drawings being a pulley 46 adapted to be connected by means of a drive belt, or otherwise, to any desired source of power.

The interior of this pulverizer casing is divided into a plurality of impact compartments by a plurality of circular shell or stationary impact members 47 which are divided into two sections, one section being mounted in and carried by the upper section of the pulverizer casing 19, the other portion being carried by the lower section of the casing. The two parts of these shell or impact members 47 are rigidly secured to their respective casing portion by the bolts and nuts 48 which pass through the openings 49 and registering openings in the casing 19. The construction of these shell members is best shown in Figs. 3 to 7 inclusive. As shown, these shell members have a cylindrical internally corrugated portion 50, the outer wall of which is of the shape of and adapted to lie flush against the internal cylindrical wall of the casing 19; and an annular plane portion 51 formed and lying, preferably, at right angles to the cylindrical portion 50 and which is adapted to assume a position to separate the interior of the pulverizer casing into a plurality of compartments. The annular plane section 51 is so formed as to have an annular series of spaced ribs 52. These ribs are diamond shaped in cross section so that the opposing sides of adjacent ribs converge toward each other to a central point terminating at the slot 53 between the same. These shell or stationary impact members 47 are preferably cast and formed to withstand the impact forces to which they may be subjected during the pulverizing of the ore.

The shell members 47 provide a turbine-effect stationary blading which will be very effective in assisting to pulverize the coal, as will be explained hereinafter. The bolt openings 49 and the corresponding openings in the casing 19 for securing the adjacent members 47 are so located that the shell or blade sections carried by the respective casing sections are so positioned that the slots 53 in the annular plane portion of the adjacent members assume a staggered relation relative to each other so that there will not be a straight and uniform passage through the slots of the first shell member, on through the second, third and so on.

Mounted in each of the compartments formed by the stationary blading members is a rotor impact or rotatable blading member comprising a cylindrical rotor disk 54 carried by a hub 55 which is keyed to the drive shaft 16 as at 56. The rotor disk has a plurality of integrally formed and equally spaced peripheral arms 54ª which carry removable rectangularly shaped rotor or impact hammers 57. These hammers are of such shape and are carried by the disk arms 54ª in such a way that a circular impact space is formed between the outer ends thereof and the corrugated shell lining surface 50. Also, the impact hammers 57 are of such width as to be spaced a predetermined distance from the annular plane or web surface of the shell or stationary blading 47, as shown in Fig. 4, to form an impact space therebetween.

A centrifugal fan 59 is mounted on the shaft 16 at the outlet end of the pulverizer casing, the purposes of which will be explained more fully hereinafter. The impact hammers have their edges or sides which are nearest the fan 59 beveled or formed at an angle as shown at 57ª in Fig. 4. The purpose of this is to cause the impact hammers during their rotation to tend to throw the ore which comes in contact with that portion during their rotation toward the fan, with the result that these impact hammers serve as a positive means for driving the finer or pulverized ore toward the fan, the pulverized and lighter particles being driven through the slots 53 into the adjoining compartment, this positive mechanical action being in addition to the suction of the fan 59.

As the coal is fed through the passage 37 into the first impact compartment, it is gathered up and dashed, by the centrifugal action of the rotary impact hammers 57 in that chamber, against the corrugated wall surface 50 and against the stationary blading at the sides of the impact hammers. The arrangement of these parts is such that the rapidly rotating rotor 54 and hammers 57 throw the particles or lumps so admitted against the corrugated surface 50 of the stationary blading, such lumps rebounding therefrom at an angle dependent upon that portion of the curvature of the corrugation upon which it strikes, the rebound action either throwing the lumps directly into the path of the impact hammers or against other adjacent corrugations and then back into the path of the hammers. This action takes place in addition to the impact of these particles with the newly delivered lumps which have entered the impact compartment. Thus the lumps are subjected continuously to impact forces, either from the corrugated surface or the impact hammers or other coal thrown by the impact hammers, whereby such lumps are being continuously broken up into smaller parts. In addition to this, the plane surface of the stationary blading lying parallel with the rotor 54 and provided with spaced diamond shape ribs presents, in effect, a plane corrugated surface at the side of the rotor hammers 57, the ribs serving to cause an effect upon the ore particles delivered against them similar to the corrugations in the corrugated lining, with the exception that the slots 53 in plane corrugated surface permit some of the particles to pass therethrough.

The foregoing reactionary impact action is clearly illustrated in the chart of Fig. 12 which diagrammatically represents the action just explained. In this figure an impact hammer 57 is shown in a plurality of positions relative to a certain rib, the dotted lines showing generally the path which the ore particles take from the beveled edge of the rotor hammers to the adjacent face of the reactionary or stationary blading back into the path of the succeeding hammers and through the slots between the ribs, and the dash lines showing the path of the lumps or larger particles caught by the face of the blading and thrown against the ribs.

Referring to Fig. 12, in explanation, it is seen that as the hammer approaches (first position) a rib it throws the lumps of ore against the angular surface of the rib, such lump or lumps being deflected by that face of the rib past the same into the path of the same or other hammers where it is again picked up and again thrown against other ribs, the lump or lumps tending to be broken up into finer or smaller particles. Some of these particles may be picked up by the impact hammers, after glancing off the rib, in such a way as to be thrown against the corrugated lining 50 and then back into the path of the hammers in such a way as to be again deflected against the angular surfaces of the ribs and again into the path of the hammers, and so on. Also, as this action takes place, the beveled edge 57a of the hammers as the hammers approach the ribs, tends to throw the particles against the adjacent rib surfaces where, by the force of impact, such particles are broken up to a further extent, some of which are deflected back into the path of the approaching hammers, the other particles passing through the slots 53 into the next compartment. The direction of the rebound of such particles is determined by the angular relation between the adjacent rib surfaces and the beveled edge surface of the impact hammers and by the position which that beveled portion of the impact hammer assumes relative to the adjacent face of the ribs. As this impact hammer moves forwardly and assumes an advanced relation with the angular surface of the rib (second position) the particles caught and thrown by the angular surface of the hammer may take a different direction in rebound, in other words, all of the particles so caught may be directed back into the path of the succeeding impact hammers; and as the hammer continues its advancing movement (third position) it may assume such a relation to the rib that a portion of the coal strikes the rib at such an angle as to cause it to rebound in the path of the succeeding hammers and other of such particles are caused to strike the ribs in such a way as to rebound against the inclined surface of the adjacent rib and back into the path of the succeeding hammers in a plurality of directions. In all of these positions of the hammer relative to the rib, some of the finer coal particles which are thrown against the inclined rib surface or which result from such impact, rebound so as to throw them through the slots between the ribs, this being true particularly of the smaller particles tending toward the pulverized form.

The rotors 54 are of such construction that particles of coal entering at one side thereof or falling on one side thereof pass through the impact space between the corrugated lining 50 and the impact hammers in order to pass from one compartment to another through the stationary blading. So, in following the coal particles which pass from the first and enter the second impact compartment and from the second into the third and so on, it is seen that practically all such particles due to the centrifugal action of the rotors 54 must pass through the slots 53 between the annular series of ribs separating the first and second compartment. These particles, in passing through the compartment, due to the arrangement of the parts, as explained, pass through the impact space between the compartment wall and inlet side of the hammers 57, through the impact space between the end of the hammers 57 and the lining 50, and through the impact space between the beveled hammer edge 57a and the adjacent ribs 52. Some of the larger particles may find their way through the central concentric opening 60 in the stationary blading but they cannot pass directly on through due to the obstruction imposed by the rotor 54, with the result that such particles must pass through as just explained. Due to the diamond-shape rib construction of the stationary blading 54 which separates the first and second compartments, some of the particles caught by the rotor hammers in the second compartment are thrown against the angled surfaces of the adjacent ribs and are caused to take an impact path and rebound path similar to the path shown in dash lines in Fig. 12. In this manner the partially broken up coal particles, some being already pulverized, in passing to the second compartment, and from the second to the third and so on, are subjected to a triple rebound and reactionary impact, with the result that the ore when it has passed through the last compartment is in a thoroughly pulverized state, ready for delivery for combustion. Six impact compartments are shown in the drawings, but it is to be understood that I do not desire to be limited to any specific number of compartments because the number of such compartments can be varied according to the fuel ore used and particular conditions of use.

It is obvious that some of the fuel ore delivered to the first compartment will be reduced to a thoroughly pulverized state in that compartment, this pulverized coal being added to by pulverized coal in the second compartment and so on until all of the coal is pulverized. During the pulverizing action the centrifugal fan 59 is rapidly rotating along with the rotors 54, creating a suction effect in the pulverizer casing, through the fuel feed inlet 37 and air inlet 6, with the result that a certain amount of air, dependent upon the setting of the air valve 7, is sucked through the pulverizer casing by the fan. As this air is sucked through the casing, it gathers up the pulverized coal and carries it in suspension through the pulverizer casing compartments, the pulverized coal in suspension being added to from compartment to compartment, so that by the time this coal and air reaches the fan 59 and is delivered thereby through the discharge nozzle 45, the air and pulverized fuel are thoroughly admixed in the proper proportions to form the proper and desired combustible mixture.

As is obvious from the foregoing, the air which enters the pulverizer casing and the pulverized coal which passes along with it cannot pass directly through the pulverizer casing but must take an irregular course therethrough. This is brought about due to the fact that no openings are provided in the rotors 54 and the slots in the adjacent stationary blade members or shells are arranged in staggered relation. Thus, some of the air entering the first compartment passes upwardly around the rotor and then passes through the slots in the lining separating the first and second compartment and also down along the rotor through the opening 60 in the first stationary blade member; then the air passing into the second compartment, in order to pass on to the third, must take a lateral zigzag course through the slots of the second stationary blade member or a vertical zigzag course over the second rotor through the second stationary blade opening 60. In this manner the air is given a drubbing or scrubbing which insures, by the time it reaches the fan, a thorough admixture of air and pulverized fuel, any coarser particles, which may tend to pass along with the air being, in effect, screened and left behind for further impact to reduce them to the desired pulverized state. The beveled surfaces 57a of the impact hammers, being located on the fan side thereof tend to aid the fan and air drawn in thereby in carrying the fuel ore as it is pulverized, from one compartment to another.

From the foregoing, the construction of my pulverizer apparatus is obvious. By way of illustration and for facilitating the explanation of operation, it is assumed that the fuel ore fed is coal and that the fuel is to be directed to burners for heating a boiler wherein a predetermined steam pressure is to be raised and maintained for motive power purposes. The hopper 1 being directly connected to a coal supply, upon transmission of power to the main drive 16 to cause it to rotate, the feed wheel 5 is also caused to rotate simultaneously therewith. As the feed wheel rotates it gathers and selects the coal passing through the hopper 1, and delivers it to the pulverizer inlet 37, the amount of coal fed by the feed wheel 5 in a given length of time being determined by the position of the measuring sleeve 20. As the coal is fed a predetermined amount of heated air due to the action of the fan 59, is drawn through the inlet 6 and contacts with the coal fed by the feed wheel and dries it in order that it may be readily pulverized. The coal so fed through the passage 37 passes into the first pulverizer compartment where it is subjected to the action hereinbefore explained, after which it then passes into the second compartment and so on. The heated air drawn through the inlet 6 by the fan, in addition to drying the coal, passes on through the pulverizer chamber, taking an irregular course therethrough to the fan 59. During the travel of the air through the pulverizer chamber and by the time it reaches the fan it is thoroughly admixed with the pulverized fuel in the proper proportions and then delivered by the fan through the nozzle 45 to the burners for combustion. It may be assumed that a set condition exists for creating a certain heat for raising the steam pressure to a certain point at the beginning of heating up the boiler. As the boiler heats up and the steam pressure is raised, it is probable that the heat from the burners should be reduced to maintain that condition, requiring, in turn, a reduction in the amount of fuel fed. This condition is brought about through the medium of the lever 30 which may be connected to some suitable steam pressure gauging or registering device which is adapted to cause the rod 30 to be raised and lowered upon the raising and lowering of the steam pressure. Still assuming the above condition, as the steam pressure is raised to the desired point, the rod 30 may be raised by the gauging or registering device, or whatever it may be, to cause the sleeve 20 and the inlet valve 7 to assume such cooperative positions as to feed the desired amount of coal and air to produce the proper mixture, and maintain the desired steam pressure. If the steam pressure should rise above the desired point, the rod 30 is raised still further by the steam pressure, causing the sleeve 20 to further restrict the feed of coal and the valve 7 to further restrict the flow of air to cut down the combustible mixture fed to the burners; or if the steam pressure should fall below the desired point then the rod 30 will move so as to move the measuring sleeve 20 and the valve 7 to deliver a greater amount of fuel and air and, consequently, a greater amount of combustible mixture.

Thus it is seen that I have provided a fuel pulverizing system wherein the human element is entirely eliminated and wherein positive and uniform temperature, pressure, or whatever it may be, conditions may be produced and maintained; and that all of this is accomplished all the more effectively, with a greater saving in cost of operation and with all around increased efficiency, by providing for positively and more thoroughly pulverizing and admixing all of the fuel ore which may be fed for that purpose.

I claim:

1. In a fuel pulverizing system, the combination with a feed hopper, of a pulverizing means, a bladed wheel for feeding the ore from said hopper to said pulverizing means, said blades being arranged to divide said wheel into a plurality of pockets, means cooperating with said wheel and blades for varying the size of said pockets, and means positively controlled by said pocket varying means for drying the fuel ore.

2. In a fuel pulverizing system, the combination with a hopper, and pulverizing means of a pocketed feed wheel for feeding the ore from said hopper, a cylindrical drum automatically slidable over said feed wheel for varying the size of said pockets to vary the amount of fuel fed in a given time, an air inlet for admitting heated air to the ore fed by said wheel, and a valve for controlling the size of said inlet, said valve being operatively connected to and adapted for movement simultaneously with said drum.

3. In a pulverizing system, a pulverizer comprising a casing having a rotatable shaft passing therethrough, a plurality of stationary impact members, each of said members having an internally corrugated cylindrical portion carried by said casing and a slotted annular plane portion adapted to divide the interior of said chamber into compartments, a rotor disk carried by said shaft in each compartment, and peripheral impact members carried by said disk.

4. In a pulverizing system, a pulverizer comprising a stationary cylindrical casing having a rotatable shaft passing therethrough; a plurality of stationary impact members, each of said impact members having an internally corrugated cylindrical portion conforming in shape to and carried by said casing, and an annular plane section associated with said cylindrical portion and provided with a plurality of spaced ribs diamond shaped in cross-section adapted to divide the interior of said casing into a plurality of compartments when said impact members are placed therein side by side; a rotor disk mounted in said shaft in each of said compartments, and peripheral impact members carried by said disk.

5. In a pulverizing system, a pulverizer comprising a casing having a rotatable shaft passing longitudinally therethrough, a plurality of partition members spaced and arranged in parallel formation to divide the interior of said casing into a plurality of compartments, said parallel partition members being formed with a plurality of diamond shaped radial ribs, and impact members mounted on said shaft in said compartments and adapted to cooperate with said radial ribs.

6. A fuel pulverizer comprising a casing having a plurality of spaced partitioning walls, closed-end radial slots in each of said walls, the radial openings in adjacent walls being staggered relative to each other.

7. A fuel pulverizer comprising a cylindrical casing having a plurality of laterally-disposed spaced partitioning walls dividing the interior of said casing into a plurality of compartments, closed-end radial slots in each of said walls to connect successive compartments, the radial slots in the adjacent walls being arranged in staggered relation.

8. In a fuel pulverizer system, a pulverizer comprising a cylindrical casing having a plurality of plane partitioning members carried internally thereof for dividing said casing into a plurality of compartments, closed-end radial slots in said members for connecting successive compartments, the surface between successive slots being diamond shaped in cross section.

9. In a fuel pulverizing system, a pulverizer comprising a cylindrical casing having a plurality of cylindrical partitioning members carried internally thereof for dividing said casing into a plurality of compartments, a centrally disposed and concentric opening in each of said members, radial slots extending from adjacent the periphery of said members to adjacent the central opening, the surface between said slots being diamond shaped in cross section, and a rotary impact member in each compartment cooperating with said diamond shaped surfaces.

10. In a pulverizing system a pulverizer comprising a circular casing, a plurality of circular spaced partition members mounted therein for dividing the interior thereof into compartments, said members being formed with a plurality of doubled V-shaped radial slots through which adjoining compartments are connected, a rotatable disk mounted in each compartment, and a plurality of rectangularly shaped impact members carried by said disk and having an angled surface to cooperate with the adjacent angled walls of said slots.

11. In a pulverizing system, a pulverizer comprising a casing, a plurality of spaced and parallel partition members mounted therein for dividing it into compartments, said members being formed with a plurality of radial ribs diamond shaped in cross section, a rotatable disk mounted in each compartment and a plurality of rectangularly shaped impact members having their edge adjacent the outlet end of said casing beveled to cooperate with said ribs.

12. In a fuel pulverizing system, pulverizing means having a cylindrical casing forming a pulverizing chamber, partitioning members for dividing said chamber into a plurality of successively connected compartments, each member having a cylindrical portion carried by said casing and a connected annular plane portion, a waste-receiving chamber located beneath said pulverizing chamber, one of said partitioning members having an opening in its cylindrical portion communicating said pulverizing chamber with said waste chamber, and an external opening for said waste chamber.

13. In a fuel pulverizing system, the combination of a container for fuel ore, means for feeding the ore from said container, and a pulverizing means in communication with said feeding means, said pulverizing means comprising a chamber divided into a plurality of angularly-shaped compartments, each having connected side and top walls which have ribbed surfaces, a disk rotor member in each compartment, and a plurality of peripheral impact members carried by said rotor members in uniformly spaced relation to the walls of said compartments, said impact members being beveled to positively direct the ore against the ribbed surfaces on the side walls.

14. In a pulverizing system, a pulverizer comprising a stationary casing having a rotatable shaft passing longitudinally therethrough, a plurality of stationary impact members each internally ribbed throughout to form both side and top impact surfaces, the said side surfaces being provided with spaced slots, said impact members being carried by said casing and also adapted to divide the casing into a plurality of compartments, and movable impact members mounted in said compartments.

15. In a fuel pulverizing system, a pulverizer comprising a casing divided into a plurality of compartments having ribbed wall surfaces throughout, a rotatable shaft passing through said compartments, and a rotor disk carried by said shaft in each compartment and having a plurality of rectangularly-shaped impact members mounted on its peripheral surface, said impact members each having its forward side edge beveled and positively cooperating with the adjacent ribbed wall surfaces to positively direct the material being pulverized against said ribbed wall surfaces.

16. In the art of pulverizing fuel ore, the improvements which consists in feeding the fuel ore to a zone wherein pulverization takes place, in thence feeding the thus pulverized fuel to a zone of utilization, varying the quantity of fuel ore fed to the pulverization zone automatically in accordance with the needs of the pulverized fuel at the utilization zone, applying a drying medium to the fuel ore beginning at the entrance into the feeding zone, while it is passing toward and before it reaches the pulverization zone whereby to enhance pulverization thereof, and causing said same air to commingle with the pulverized fuel ore in the pulverization zone to form a combustible mixture for delivery from the pulverization zone, said same air serving as the sole flotation means for carrying the pulverized fuel or to the utilization zone.

17. In the art of pulverizing fuel ore, the improvement which consists in feeding fuel ore to a pulverizing zone wherein pulverization of the ore is effected, leading the thus pulverized fuel by air flotation to a zone of utilization, in automatically increasing or diminishing the amount of fuel ore fed to the pulverizing chambers in accordance with variations in fuel requirements at the utilization zone, applying heated air to the fuel ore throughout its entire transit to the pulverization zone, causing such heated air to pass on into the pulverization zone and admixture of the same with the pulverized ore and varying the quantity of air thus applied in accordance with the variations in the amount of ore being fed to the pulverizing chamber, said heated air being all of the air applied to the ore before it reaches the utilization zone.

18. A fuel pulverizer comprising a casing, means in said casing dividing its interior into a plurality of compartments, means controlling the passage of the material to be pulverized from one compartment to the other, which means is of a character predetermining the size of the material which may pass from compartment to compartment, and impact means mounted in each of said compartments cooperating with said controlling means for passing said sized material from compartment to compartment.

19. In a system for pulverizing and feeding fuel to a heating plant, pulverizing means, and means for feeding the material to be pulverized including a rotatable shaft, a feed member carried by said shaft and having spaced radial extensions dividing said member into a plurality of feed chambers, means slidable over said extensions and said shaft and in said chambers for varying the size of said chambers, an actuating member automatically controlled by and in accord with pressure conditions in the heating plant, and operating connections between said actuating member and said slidable member.

20. In a system for pulverizing and feeding fuel to a heating plant, pulverizing means, and means for feeding the material to be pulverized including a rotatable shaft, a feed member carried by and rotatable with said shaft and having spaced radial extensions dividing said member into a plurality of longitudinal feed chambers, a drum member forming one end of said chamber and slidable over said extensions and said shaft and in said chamber for varying the length of said chamber, an actuating member automatically controlled by and in accord with pressure conditions in the heating plant, and operating connections between said actuating member and said slidable means for effecting said sliding movement.

21. In a system for pulverizing and feeding fuel to a heating plant, pulverizing means; a feeder comprising a chambered feed element and means for varying the size of said chamber, a valved air inlet connected directly to said feeder; an actuating member automatically controlled by and in accord with pressure conditions in the heating plant; connections between the valve of said inlet and said actuating member; and connections between said chamber varying means and said actuating member, whereby the amount of air admitted to said pulverizing means is automatically varied directly as the amount of fuel fed is varied.

In testimony whereof, I have subscribed my name.

GEORGE A. CONRATH.